US012689313B2

(12) United States Patent
Cheng et al.

(10) Patent No.: US 12,689,313 B2
(45) Date of Patent: Jul. 21, 2026

(54) PIEZOELECTRIC DRIVING MECHANISM

(71) Applicant: Actutek Corporation, Taoyuan City (TW)

(72) Inventors: Pai-Jui Cheng, Taoyuan City (TW); Shu-Shan Chen, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 684 days.

(21) Appl. No.: 18/191,515

(22) Filed: Mar. 28, 2023

(65) Prior Publication Data

US 2024/0258937 A1 Aug. 1, 2024

(30) Foreign Application Priority Data

Jan. 31, 2023 (CN) .......................... 202320143801.8

(51) Int. Cl.
*H02N 2/02* (2006.01)
*H02N 2/00* (2006.01)

(52) U.S. Cl.
CPC ............. *H02N 2/026* (2013.01); *H02N 2/001* (2013.01)

(58) Field of Classification Search
CPC ............................... H02N 2/026; H02N 2/001
See application file for complete search history.

(56) References Cited

U.S. PATENT DOCUMENTS 5,039,899 A * 8/1991 Yamaguchi ............ H02N 2/026
310/323.16
2023/0408790 A1* 12/2023 Suzuki ..................... G02B 7/08

* cited by examiner

*Primary Examiner* — Emily P Pham
(74) *Attorney, Agent, or Firm* — MUNCY, GEISSLER, OLDS & LOWE, P.C.

(57) ABSTRACT

A driving mechanism is provided that includes a fixed assembly, a movable part, and a driving module. The movable part is movable relative to the fixed assembly. The driving module is configured to drive the movable part to move relative to the fixed assembly. When viewed in a first axis, the driving module is disposed between the fixed assembly and the movable part.

19 Claims, 14 Drawing Sheets

PIEZOELECTRIC DRIVING MECHANISM

CROSS REFERENCE TO RELATED APPLICATIONS

This application claims the benefit of China application No. 202320143801.8, filed on Jan. 31, 2023, the entirety of which is incorporated by reference herein.

BACKGROUND OF THE INVENTION

Field of the Invention

The present disclosure relates to a driving mechanism, and in particular it relates to a driving mechanism with a piezoelectric element.

Description of the Related Art

As technology has developed, many of today's electronic devices (such as smartphones or digital cameras) have components such as motors to drive lenses or other objects. However, the displacement accuracy of conventional motors, such as stepper motors and voice coil motors, cannot meet certain specific requirements.

Therefore, how to design a driving mechanism that can improve displacement accuracy and achieve miniaturization are topics nowadays that need to be discussed and solved.

BRIEF SUMMARY OF THE INVENTION

According to some embodiments of the disclosure, the present disclosure provides a driving mechanism including a fixed assembly, a movable part, and a driving module. The movable part is movable relative to the fixed assembly. The driving module is configured to drive the movable part to move relative to the fixed assembly. When viewed in a first axis, the driving module is disposed between the fixed assembly and the movable part.

According to some embodiments, the driving module includes a first elastic member and a piezoelectric assembly. The driving module further includes a driving member fixedly disposed on the first elastic member. The first elastic member is made of a first metal material. The first metal material includes stainless steel. The driving member is made of a second metal material. The second metal material includes tool steel. Rigidity of the driving member is greater than rigidity of the first elastic member. The driving member has a cylindrical structure. The piezoelectric assembly is configured to drive the first elastic member to deform, so as to drive the driving member to move relative to the fixed assembly. The driving member is configured to drive the movable part to move relative to the fixed assembly along the first axis.

According to some embodiments, when viewed along a second axis, the first elastic member has a rectangular structure. The first axis is perpendicular to the second axis. The first elastic member has a first side arm and a second side arm. The first side arm and the second side arm extend along the first axis. The driving member is fixedly disposed on the first side arm. The first elastic member further has a third side arm and a fourth side arm connected between the first side arm and the second side arm. The third side arm and the fourth side arm extend along a third axis. The third axis is perpendicular to the first axis and the second axis.

According to some embodiments, the first elastic member further has a first inner arm and a second inner arm. The first inner arm and the second inner arm are connected between the first side arm and the second side arm. The first side arm, the second side arm, the third side arm, the fourth side arm, the first inner arm and the second inner arm are integrally formed as one piece. The first inner arm is bent toward the third side arm. The second inner arm is bent toward the fourth side arm. A central hole is formed between the first inner arm and the second inner arm. The central hole has an elliptical structure.

According to some embodiments, the piezoelectric assembly includes a first piezoelectric element connected between the third side arm and the first inner arm. When viewed along the second axis, the first piezoelectric element has a rectangular cuboid structure. The first piezoelectric element has a first top surface fixedly connected to the first inner arm by a first adhesive element. The first top surface has four sides, and the first adhesive element is disposed on the four sides. The first piezoelectric element has a first bottom surface fixedly connected to the third side arm by a second adhesive element. The first bottom surface has four sides, and the second adhesive element is disposed on the four sides. The first top surface and the first bottom surface are non-conductive.

According to some embodiments, the piezoelectric assembly includes a second piezoelectric element connected between the fourth side arm and the second inner arm. When viewed along the second axis, the second piezoelectric element has a rectangular cuboid structure. The second piezoelectric element has a second top surface fixedly connected to the second inner arm by a third adhesive element. The second top surface has four sides, and the third adhesive element is disposed on the four sides. The second piezoelectric element has a second bottom surface fixedly connected to the fourth side arm by a fourth adhesive element. The second bottom surface has four sides, and the fourth adhesive element is disposed on the four sides. The second top surface and the second bottom surface are non-conductive. When viewed along the second axis, the third side arm, the first piezoelectric element and the first inner arm are symmetrical to the fourth side arm, the second piezoelectric element and the second inner arm.

According to some embodiments, the first piezoelectric element is configured to receive a first control signal. The second piezoelectric element is configured to receive a second control signal. The first control signal is different from the second control signal. The frequency of the first control signal and the second control signal is equal to the overall resonance frequency of the first elastic member, the first piezoelectric element and the second piezoelectric element.

According to some embodiments, a plurality of notches are formed on the first elastic member. The notches include a first notch formed between the second side arm and the third side arm. The notches further include a second notch formed between the second side arm and the fourth side arm. The first notch is symmetrical to the second notch.

According to some embodiments, the notches further include a third notch formed between the first side arm and the third side arm. The notches further include a fourth notch formed between the first side arm and the fourth side arm. The third notch is symmetrical to the fourth notch. Each of the first notch to the fourth notch has a circular arc structure.

According to some embodiments, the notches further include a fifth notch formed between the second side arm and the third side arm. The notches further include a sixth notch formed between the second side arm and the fourth side arm. The fifth notch is symmetrical to the sixth notch.

The first notch and the fifth notch are formed on opposite sides of the third side arm. The second notch and the sixth notch are formed on opposite sides of the fourth side arm.

According to some embodiments, the notches further include a seventh notch formed between the first side arm and the third side arm. The notches further include an eighth notch formed between the first side arm and the fourth side arm. The seventh notch is symmetrical to the eighth notch. The third notch and the seventh notch are formed on opposite sides of the third side arm. The fourth notch and the eighth notch are formed on opposite sides of the fourth side arm.

According to some embodiments, the third side arm has a thick column portion and a thin column portion. The thin column portion is formed between the first notch and the fifth notch. The width of the thick column portion along the first axis is at least twice the width of the thin column portion along the first axis.

According to some embodiments, the first elastic member further has a first bevel arm connected between the first side arm and the third side arm. The first bevel arm is not parallel to the first axis and the third axis. The third notch and the seventh notch are formed on the first bevel arm.

According to some embodiments, the first elastic member further has a second bevel arm connected between the first side arm and the fourth side arm. The second bevel arm is not parallel to the first axis and the third axis. The fourth notch and the eighth notch are formed on the first bevel arm.

According to some embodiments, the first piezoelectric element has a first leading wire and a second leading wire, which are electrically connected to an external control circuit. The first leading wire extends from a first side surface of the first piezoelectric element. The second leading wire extends from a second side surface of the first piezoelectric element. The first side surface is connected between the first top surface and the first bottom surface. The second side surface is connected between the first top surface and the first bottom surface.

According to some embodiments, the second piezoelectric element has a third leading wire and a fourth leading wire which are electrically connected to the external control circuit. The third leading wire extends from a third side surface of the second piezoelectric element. The fourth leading wire extends from a fourth side surface of the second piezoelectric element. The third side surface is connected between the second top surface and the second bottom surface. The fourth side surface is connected between the second top surface and the second bottom surface. The fixed assembly has at least one opening, and the first leading wire to the fourth leading wire pass through the at least one opening to be connected to the external control circuit.

According to some embodiments, the first piezoelectric element is configured to deform according to the first control signal. The second piezoelectric element is configured to deform according to the second control signal. The first control signal and the second control signal are AC signals. The first piezoelectric element is configured to expand or contract according to the first control signal. The second piezoelectric element is configured to expand or contract according to the second control signal. When the phase difference between the first control signal and the second control signal is 0 degrees, the first piezoelectric element and the second piezoelectric element drive the first elastic member to deform so that the driving member moves back and forth along the third axis.

According to some embodiments, when the phase difference between the first control signal and the second control signal is 180 degrees, the first piezoelectric element and the second piezoelectric element drive the first elastic member to deform so that the driving member moves back and forth along the first axis.

According to some embodiments, when the phase difference between the first control signal and the second control signal is-90 degrees, the first piezoelectric element and the second piezoelectric element drive the first elastic member to deform so that the driving member rotates clockwise around the second axis. When the driving member rotates clockwise around the second axis, the trajectory of the driving member is an ellipse.

According to some embodiments, when the phase difference between the first control signal and the second control signal is 90 degrees, the first piezoelectric element and the second piezoelectric element drive the first elastic member to deform so that the driving member rotates counterclockwise around the second axis. When the driving member rotates counterclockwise around the second axis, the trajectory of the driving member is an ellipse. The displacement of the driving member is greater than the deformation of the first piezoelectric element or the second piezoelectric element.

The present disclosure provides a driving mechanism, including a fixed assembly, a movable part and a driving module. The driving module is configured to drive the movable part to move relative to the fixed assembly. The driving module can include a first elastic member, a driving member and two piezoelectric elements. The two piezoelectric elements can be deformed independently to drive the first elastic member to deform correspondingly, so as to drive the driving member to move relative to the fixed assembly.

In some embodiments, when the phase difference of the control signals received by the two piezoelectric elements is-90 degrees, the two piezoelectric elements will drive the first elastic member to deform, so that the driving member continuously rotates clockwise around the second axis. In some embodiments, when the phase difference of the control signals received by the two piezoelectric elements is 90 degrees, the two piezoelectric elements will drive the first elastic member to deform, so that the driving member continuously rotates counterclockwise around the second axis.

Based on this design, the first elastic member and the driving member can quickly drive the movable part to move back and forth along the first axis, and can greatly improve the displacement accuracy compared with the traditional motor. In addition, because the driving mechanism of the present disclosure does not require conventional coils, magnets and additional pushing components, the overall volume of the driving mechanism can be effectively reduced so as to achieve the purpose of miniaturization.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
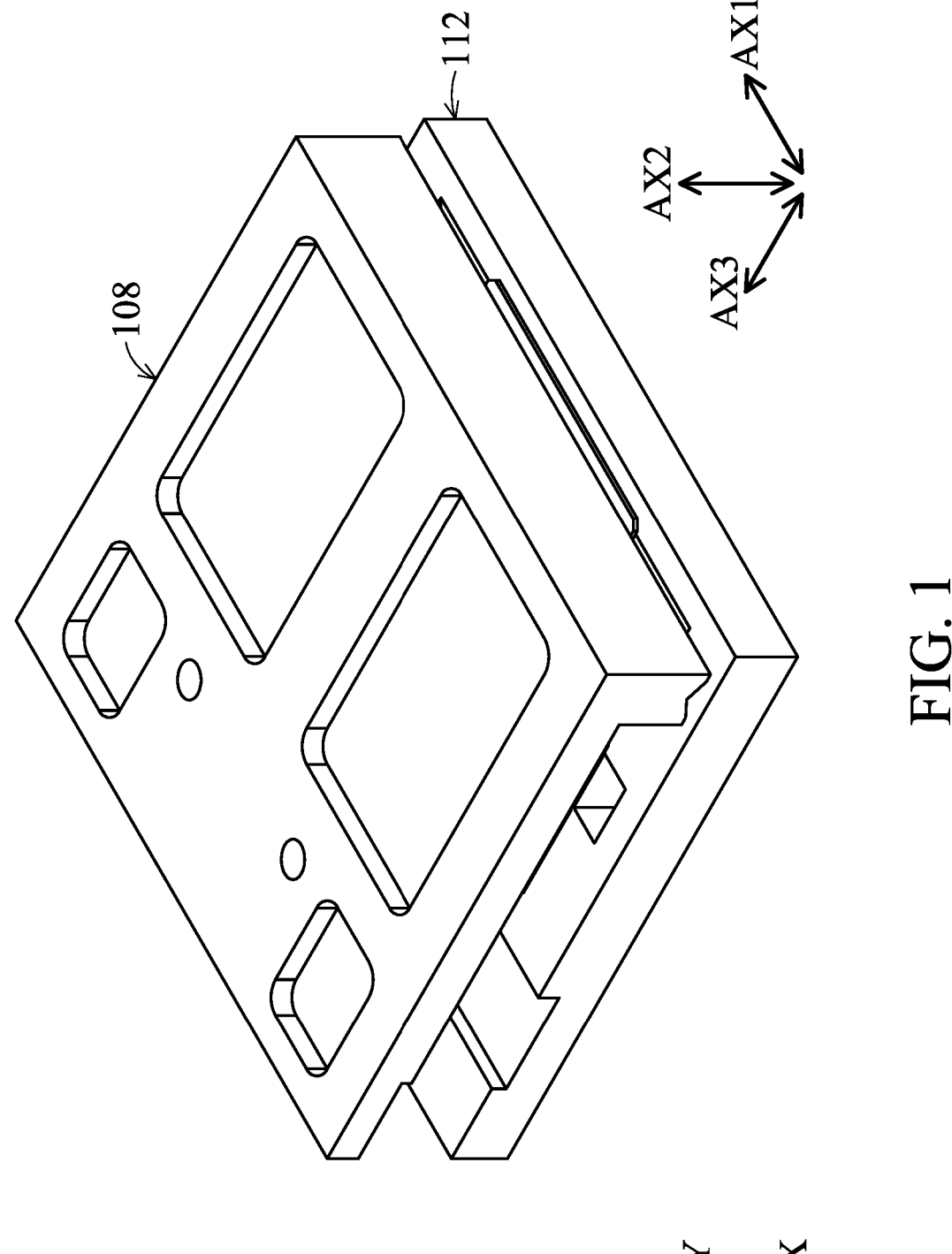
FIG. 1 is a perspective view of a driving mechanism 100 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
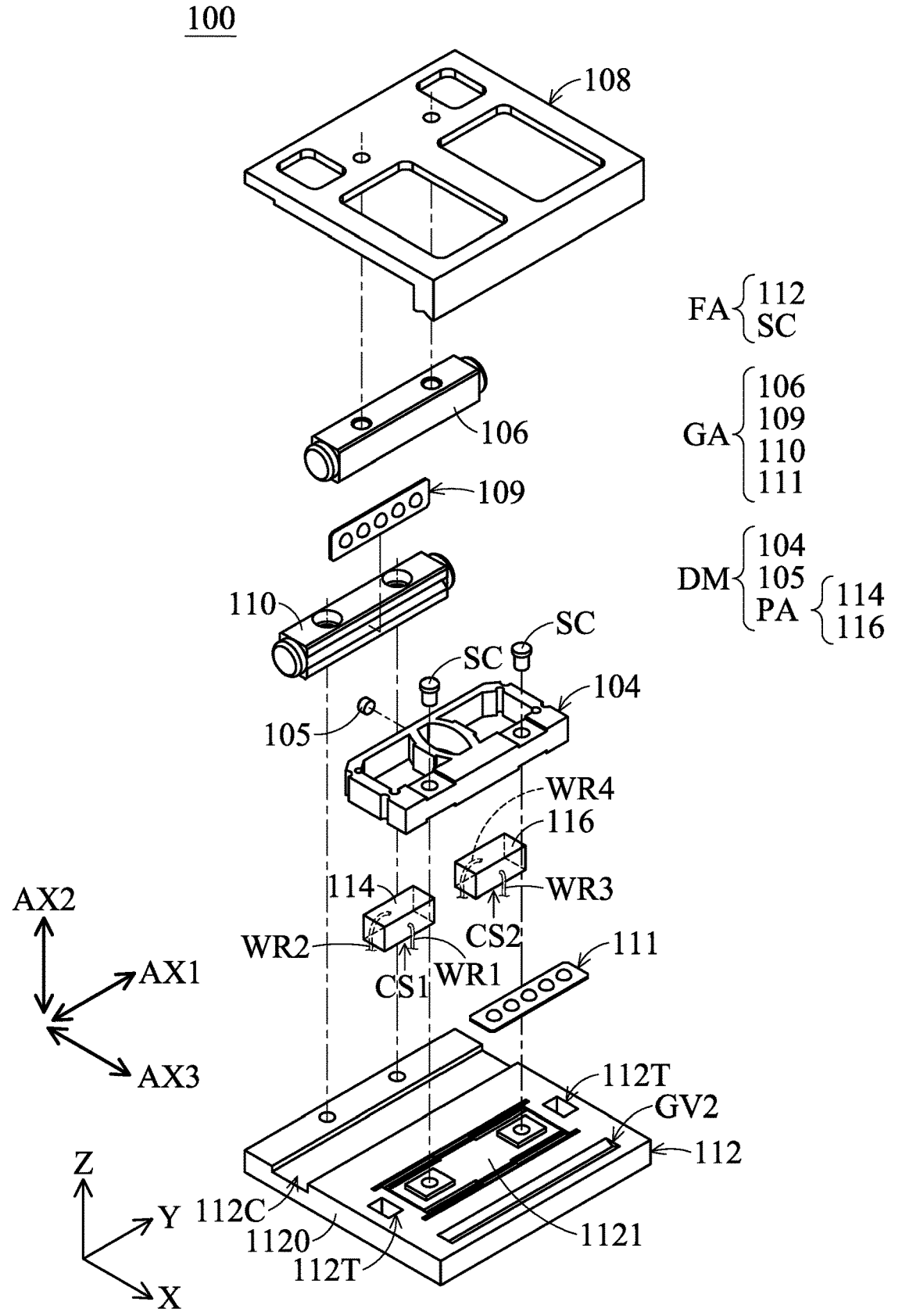
FIG. 2 is an exploded diagram of the driving mechanism 100 according to an embodiment of the present disclosure.
Figure 3:
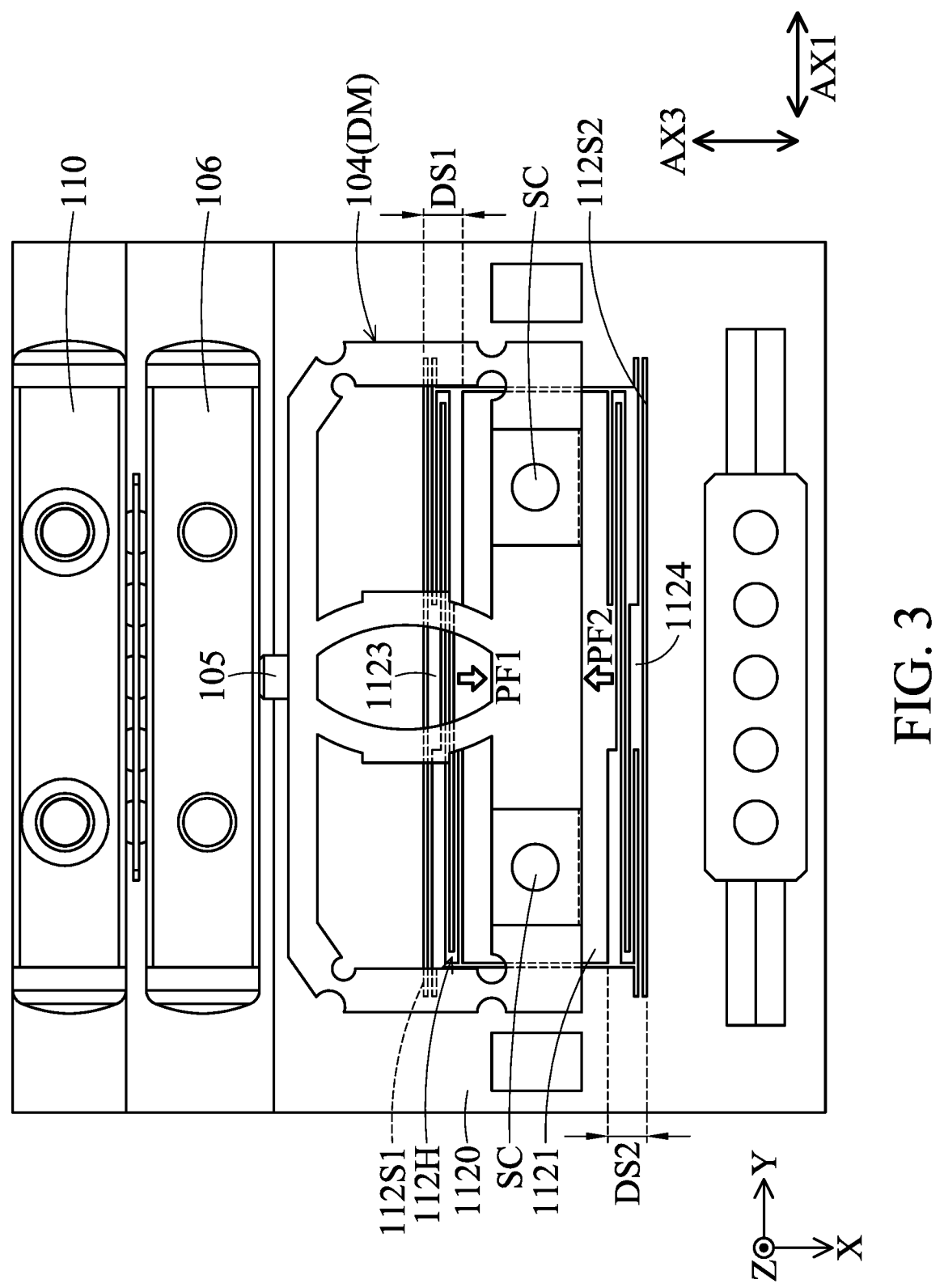
FIG. 3 is a top view of a partial structure of the driving mechanism 100 according to an embodiment of the present disclosure.
Figure 4:
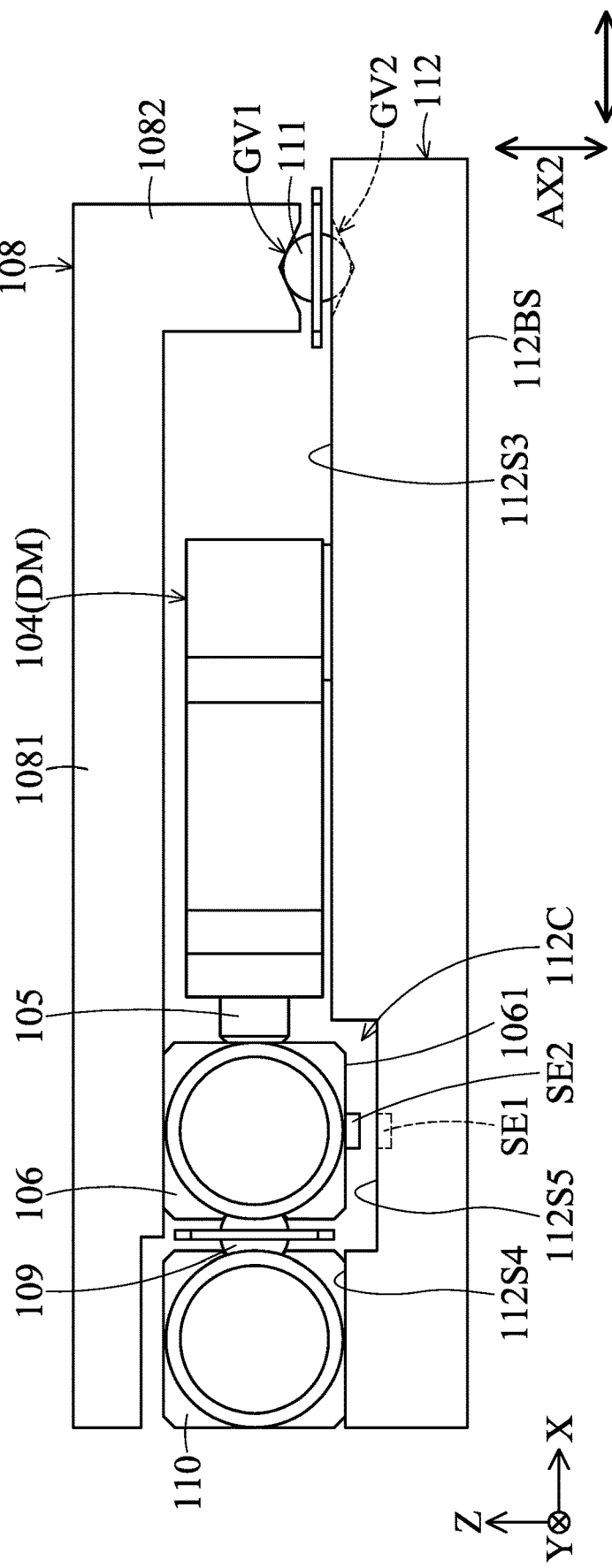
FIG. 4 is a front view of the driving mechanism 100 according to an embodiment of the present disclosure.

Please refer to FIGS. 1 to 4. FIG. 1 is a perspective view of a driving mechanism 100 according to an embodiment of the present disclosure, FIG. 2 is an exploded diagram of the driving mechanism 100 according to an embodiment of the present disclosure, FIG. 3 is a top view of a partial structure of the driving mechanism 100 according to an embodiment of the present disclosure, and FIG. 4 is a front view of the driving mechanism 100 according to an embodiment of the present disclosure. The driving mechanism 100 may be a movable platform configured to drive various elements to move. For example, the driving mechanism 100 can be applied to high-precision instruments such as 3D printers and electron microscopes.

In this embodiment, the driving mechanism 100 may include a fixed assembly FA, a movable part 108 and a driving module DM. The movable part 108 is movable relative to the fixed assembly FA. The driving module DM is configured to drive the movable part 108 to move relative to the fixed assembly FA along a first axis AX (the Y-axis). When viewed along the first axis AX1, the driving module DM is located between the fixed assembly FA and the movable part 108 (FIG. 4).

In this embodiment, as shown in FIG. 2, the fixed assembly FA includes a base 112, and the driving module DM is connected to the base 112. For example, the fixed assembly FA may include two locking elements SC configured to connect the driving module DM to the base 112 fixedly. The locking element SC is, for example, a screw, but it is not limited thereto.

Furthermore, the driving mechanism 100 may further include a guiding assembly GA configured to guide the movable part 108 to move relative to the base 112 of the fixed assembly FA along the first axis AX1. The guiding assembly GA may include a first guiding member 106 and a second guiding member 110, the first guiding member 106 can be fixedly connected to the movable part 108 by screws and other components, and the second guiding member 110 can be fixedly connected to the base 112 by screws and other components.

The driving module DM is configured to drive the first guiding member 106 to move relative to the second guiding member 110, so as to drive the movable part 108 to move along the first axis AX1. As shown in FIG. 3, when viewed along a second axis AX2 (the Z-axis), the second guiding member 110, the first guiding member 106 and the driving module DM are arranged along a third axis AX3 (the X-axis) in order. The second axis AX2 is perpendicular to the first axis AX1, and the third axis AX3 is perpendicular to the second axis AX2 and the first axis AX1.

As shown in FIG. 3, the base 112 includes a main body 1120 and a connecting block 1121, and the main body 1120 forms an accommodating opening 112H configured to accommodate the connecting block 1121. Furthermore, the base 112 may further include a first cantilever 1123 and a second cantilever 1124, and the connecting block 1121 is connected to the main body 1120 through the first cantilever 1123 and the second cantilever 1124.

When viewed along the second axis AX2, the first cantilever 1123 is connected between a first inner side surface 112S1 of the main body 1120 and the connecting block 1121. When viewed along the second axis AX2, the second cantilever 1124 is connected between a second inner side surface 112S2 of the main body 1120 and the connecting block 1121.

In this embodiment, as shown in FIG. 3 and FIG. 4, the driving module DM may include a first elastic member 104 fixedly installed on the connecting block 1121 through the aforementioned locking elements SC. Furthermore, the driving module DM may further include a driving member 105 which is fixedly disposed on the first elastic member 104.

It is worth noting that when the first elastic member 104 is affixed to the connecting block 1121, the shortest distance DS1 between the connecting block 1121 and the first inner side surface 112S1 is different from the shortest distance DS2 between the connecting block 1121 and the second inner side surface 112S2.

Specifically, the first cantilever 1123 applies a first preload PF1 to the connecting block 1121, the second cantilever 1124 applies a second preload PF2 to the connecting block 1121, and the first preload PF1 is smaller than the second preload PF2.

Therefore, after the first elastic member 104 is affixed to the connecting block 1121, the shortest distance DS1 between the connecting block 1121 and the first inner side surface 112S1 is less than the shortest distance DS2 between the connecting block 1121 and the second inner side surface 112S2.

Based on this design, the first elastic member 104 can drive the driving member 105 to actually contact the first guiding member 106, so as to effectively drive the first guiding member 106 to drive the movable part 108 to move. Therefore, this embodiment does not need additional pushing elements to push the first elastic member 104 and the driving member 105 to achieve the purpose of contacting the first guiding member 106, so that the overall volume of the driving mechanism 100 can be effectively reduced.

As shown in FIG. 4, when viewed along the first axis AX1, the movable part 108 has an L-shaped structure. Specifically, the movable part 108 has an upper covering plate 1081 and a side covering plate 1082, and the upper covering plate 1081 and the side covering plate 1082 can be integrally formed as one piece.

When viewed along the first axis AX1, the upper covering plate 1081 extends along the third axis AX3. When viewed along the first axis AX1, the side covering plate 1082 extends along the second axis AX2.

Moreover, as shown in FIG. 2 and FIG. 4, the guiding assembly GA further includes a plurality of first rolling members 109 disposed between the first guiding member 106 and the second guiding member 110. The first guiding member 106 is movable relative to the second guiding member 110 via these first rolling members 109.

Similarly, the guiding assembly GA may further include a plurality of second rolling members 111 disposed between the side covering plate 1082 and the base 112, so that the movable part 108 is movable relative to the base 112 via these second rolling members 111. The first rolling members 109 and the second rolling members 111 are rolling balls, but they are not limited thereto.

A first groove GV1 can be formed on the side covering plate 1082 and configured to accommodate these second rolling members 111. Correspondingly, a second groove GV2 can be formed on the base 112 and configured to accommodate these second rolling members 111. As shown in FIG. 4, when viewed along the first axis AX1, the first groove GV1 has a V-shaped structure, and when viewed along the first axis AX1, the second groove GV2 has a V-shaped structure.

Furthermore, the base 112 may be formed with a trench 112C extending along the first axis AX1. The base 112 further has a first top surface 112S3, a second top surface 112S4 and a bottom surface 112BS. The trench 112C is formed between the first top surface 112S3 and the second top surface 112S4.

As shown in FIG. 4, the shortest distance between the first top surface 112S3 and the bottom surface 112BS along the second axis AX2 is different from the shortest distance between the second top surface 112S4 and the bottom surface 112BS along the second axis AX2. Specifically, the shortest distance between the first top surface 112S3 and the bottom surface 112BS along the second axis AX2 is greater than the shortest distance between the second top surface 112S4 and the bottom surface 112BS along the second axis AX2.

Therefore, when viewed along the third axis AX3, the first top surface 112S3 overlaps the first guiding member 106. Furthermore, the trench 112C has a first surface 112S5 corresponding to a second surface 1061 of the first guiding member 106. When viewed along the second axis AX2, the first surface 112S5 overlaps the second surface 1061, and the first surface 112S5 is not in contact with the first guiding member 106. Based on this structural design, the height of the driving mechanism 100 along the second axis AX2 can be reduced.

In addition, the driving mechanism 100 may further include a sensing element SE1 and a sensed element SE2, the sensing element SE1 is buried under the first surface 112S5, and the sensed element SE2 is disposed on the second surface 1061. The sensing element SE1 is, for example, a Hall sensor, the sensed element SE2 can be a Hall magnet, and the positions of the sensing element SE1 and the sensed element SE2 can be interchanged.

Figure 5:
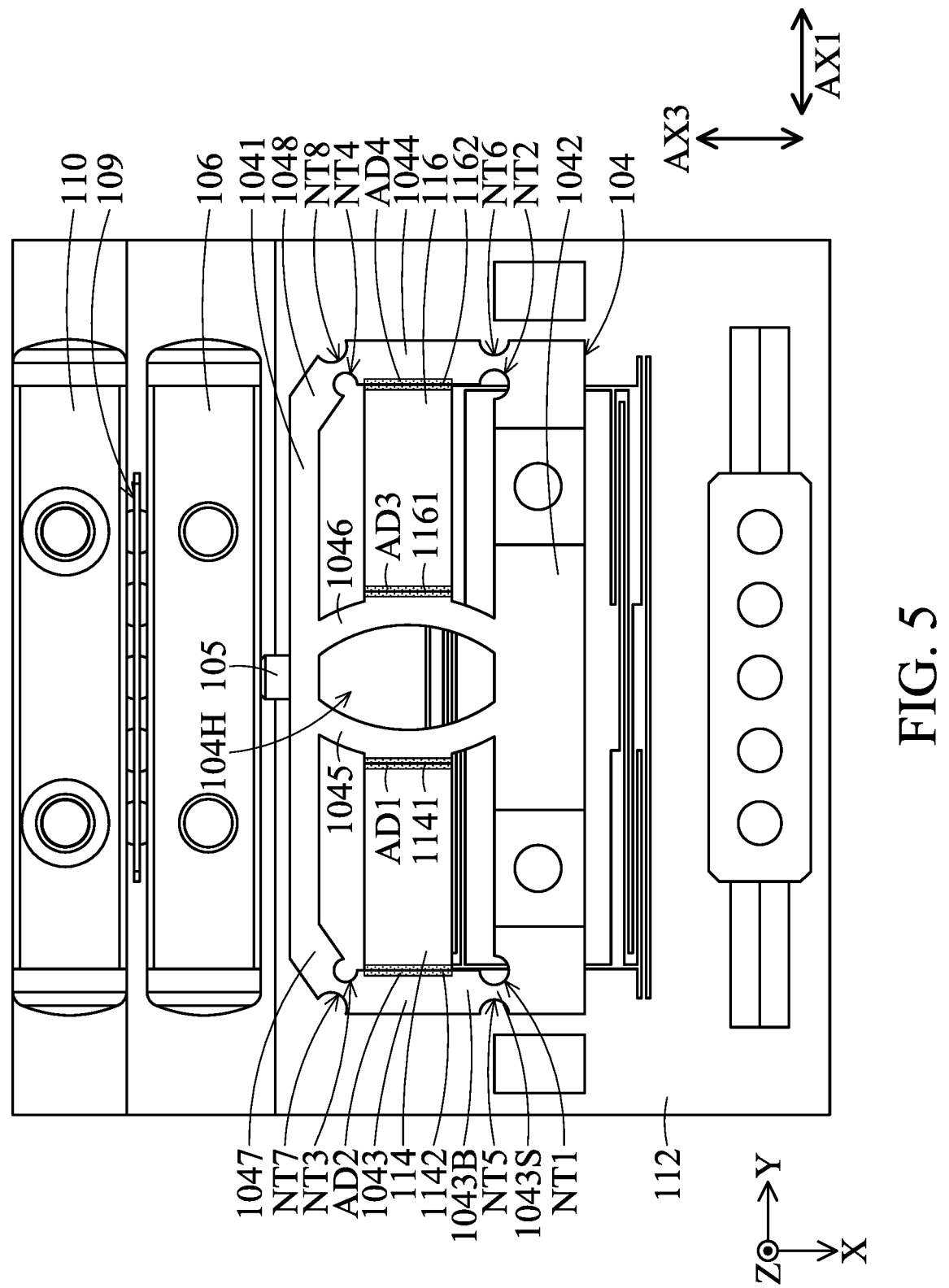
FIG. 5 is a top view of a partial structure of the driving mechanism 100 according to an embodiment of the present disclosure.

Next, please refer to FIG. 2 and FIG. 5. FIG. 5 is a top view of a partial structure of the driving mechanism 100 according to an embodiment of the present disclosure. In this embodiment, the first elastic member 104 is made of a first metal material. For example, the first metal material may include stainless steel. Furthermore, the driving member 105 can be made of a second metal material, and the second metal material can include tool steel, for example. The materials of the first elastic member 104 and the driving member 105 are not limited to this embodiment.

It should be noted that the rigidity of the driving member 105 is greater than that of the first elastic member 104. That is, when the first elastic member 104 deforms, the driving member 105 will not deform accordingly. Furthermore, the driving member 105 may have a cylindrical structure, but the shape of the driving member 105 is not limited thereto. As long as it can contact and drive the first guiding member 106, the shaped is within the scope of the present disclosure.

The driving module DM may further include a piezoelectric assembly PA configured to drive the first elastic member 104 to deform so as to drive the driving member 105 to move relative to the fixed assembly FA. Therefore, the driving member 105 can drive the movable part 108 to move along the first axis AX1 relative to the fixed assembly FA.

As shown in FIG. 5, when viewed along the second axis AX2, the first elastic member 104 may have a rectangular structure. Specifically, the first elastic member 104 has a first side arm 1041 and a second side arm 1042, the first side arm 1041 and the second side arm 1042 extend along the first axis AX1, and the driving member 105 can be fixedly disposed on the first side arm 1041 by using glue.

The first elastic member 104 may further have a third side arm 1043 and a fourth side arm 1044 which are connected between the first side arm 1041 and the second side arm 1042, and the third side arm 1043 and the fourth side arm 1044 extends along the third axis AX3.

Furthermore, the first elastic member 104 may further have a first inner arm 1045 and a second inner arm 1046. The first inner arm 1045 and the second inner arm 1046 are connected between the first side arm 1041 and the second side arm 1042, and the first side arm 1041, the second side arm 1042, the third side arm 1043, the fourth side arm 1044, the first inner arm 1045 and the second inner arm 1046 are integrally formed as one piece.

In this embodiment, the first inner arm 1045 is bent toward the third side arm 1043, and the second inner arm 1046 is bent toward the fourth side arm 1044. As shown in FIG. 5, a central hole 104H is formed between the first inner arm 1045 and the second inner arm 1046, and the central hole 104H has an elliptical structure.

In this embodiment, the piezoelectric assembly PA includes a first piezoelectric element 114 and a second piezoelectric element 116, which are disposed in the first elastic member 104. The first piezoelectric element 114 and the second piezoelectric element 116 are, for example, piezoelectric ceramics, but they are not limited thereto.

Specifically, the first piezoelectric element 114 is connected between the third side arm 1043 and the first inner arm 1045, and when viewed along the second axis AX2, the first piezoelectric element 114 has a rectangular cuboid structure.

The first piezoelectric element 114 may have a first top surface 1141, which is fixedly connected to the first inner arm 1045 by a first adhesive element AD1. The first top surface 1141 may have four sides (FIG. 2), and the first adhesive element AD1 is disposed on the four sides.

Similarly, the first piezoelectric element 114 has a first bottom surface 1142, which is fixedly connected to the third side arm 1043 by a second adhesive element AD2. The first bottom surface 1142 may have four sides, and the second adhesive element AD2 is disposed on the four sides. It should be noted that the first top surface 1141 and the first bottom surface 1142 are non-conductive.

Similarly, the second piezoelectric element 116 is connected between the fourth side arm 1044 and the second inner arm 1046, and when viewed along the second axis AX2, the second piezoelectric element 116 has a rectangular cuboid structure.

The second piezoelectric element 116 may have a second top surface 1161, which is fixedly connected to the second inner arm 1046 by a third adhesive element AD3. The second top surface 1161 may have four sides (FIG. 2), and the third adhesive element AD3 is disposed on the four sides.

Similarly, the second piezoelectric element 116 has a second bottom surface 1162, which is fixedly connected to the fourth side arm 1044 by a fourth adhesive element AD4. The second bottom surface 1162 may have four sides, and the fourth adhesive element AD4 is disposed on the four sides. The second top surface 1161 and the second bottom surface 1162 are non-conductive.

As shown in FIG. 5, when the first elastic member 104 is not deformed (the initial state), and when viewed along the second axis AX2, the third side arm 1043, the first piezoelectric element 114, the first The inner arm 1045 are symmetrical to the fourth side arm 1044, the second piezoelectric element 116 and the second inner arm 1046.

In this embodiment, a plurality of notches can be formed on the first elastic member 104. These notches may include a first notch NT1 formed between the second side arm 1042 and the third side arm 1043. These notches may further include a second notch NT2 formed between the second side arm 1042 and the fourth side arm 1044, and the first notch NT1 is symmetrical to the second notch NT2.

Moreover, these notches may further include a third notch NT3 formed between the first side arm 1041 and the third side arm 1043. These notches may further include a fourth notch NT4 formed between the first side arm 1041 and the fourth side arm 1044, and the third notch NT3 is symmetrical to the fourth notch NT4. As shown in FIG. 5, the first notch NT1 to the fourth notch NT4 each have a circular arc structure.

In addition, in order to increase the deformation of the first elastic member 104, in this embodiment, these notches may further include a fifth notch NT5 formed between the second side arm 1042 and the third side arm 1043. These notches may further include a sixth notch NT6 formed between the second side arm 1042 and the fourth side arm 1044, and the fifth notch NT5 is symmetrical to the sixth notch NT6.

In this embodiment, the first notch NT1 and the fifth notch NT5 are formed on opposite sides of the third side arm 1043, and the second notch NT2 and the sixth notch NT6 are formed on opposite sides of the fourth side arm 1044.

Similarly, the notches may further include a seventh notch NT7 formed between the first side arm 1041 and the third side arm 1043. These notches may further include an eighth notch NT8 formed between the first side arm 1041 and the fourth side arm 1044, and the seventh notch NT7 is symmetrical to the eighth notch NT.

The third notch NT3 and the seventh notch NT7 are formed on opposite sides of the third side arm 1043, and the fourth notch NT4 and the eighth notch NT8 are formed on opposite sides of the fourth side arm 1044.

As shown in FIG. 5, the third side arm 1043 may have a thick column portion 1043B and a thin column portion 1043S, and the thin column portion 1043S is formed between the first notch NT1 and the fifth notch NT5. In this embodiment, the width of the thick column portion 1043B along the first axis AX1 is at least twice the width of the thin column portion 1043S along the first axis AX1.

Based on the design of the above notches and side arms, the first elastic member 104 can be effectively deformed to drive the driving member 105. Furthermore, the number of the above notches is not limited to this embodiment. For example, in some embodiments, the first elastic member 104 may only include the first to fourth notch NT1 to NT4.

In addition, in this embodiment, the first elastic member 104 may further have a first bevel arm 1047 connected between the first side arm 1041 and the third side arm 1043. The first bevel arm 1047 is not parallel to the first axis AX1 and the third axis AX3, and the third notch NT3 and the seventh notch NT7 can be formed on the first bevel arm 1047.

Similarly, the first elastic member 104 may further have a second bevel arm 1048 connected between the first side arm 1041 and the fourth side arm 1044. The second bevel arm 1048 is not parallel to the first axis AX1 and the third axis AX3, and the fourth notch NT4 and the eighth notch NT8 can be formed on the second bevel arm 1048.

Based on the above-mentioned design of the first bevel arm 1047 and the second bevel arm 1048, the first elastic member 104 can be further rapidly deformed, thereby driving the driving member 105 to move.

Figure 6:
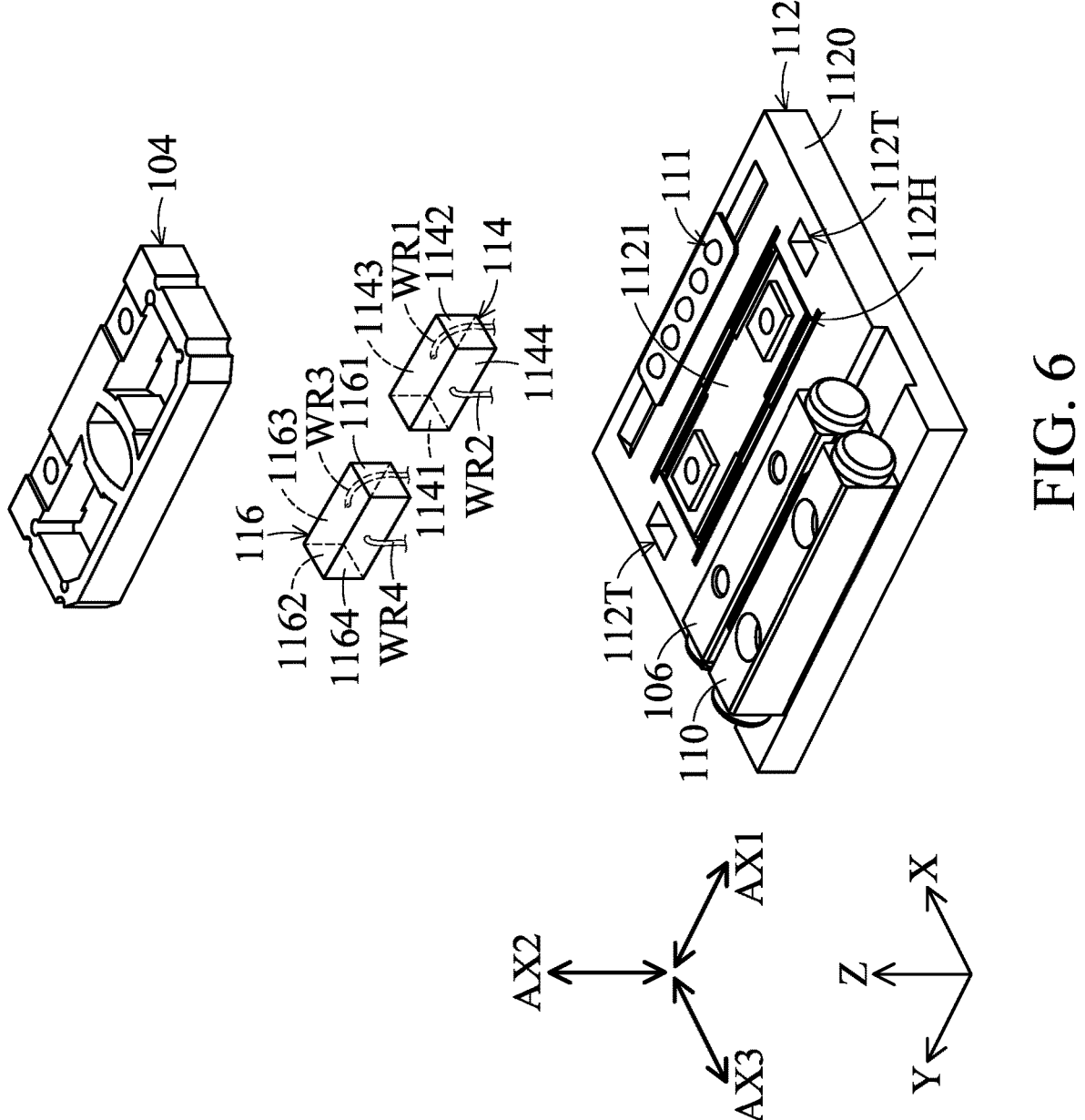
FIG. 6 is an exploded diagram of a partial structure of the driving mechanism 100 in another view according to an embodiment of the present disclosure.

Furthermore, please refer to FIG. 2 and FIG. 6, and FIG. 6 is an exploded diagram of a partial structure of the driving mechanism 100 in another view according to an embodiment of the present disclosure. In this embodiment, the first piezoelectric element 114 has a first leading wire WR1 and a second leading wire WR2, which are electrically connected to an external control circuit.

As shown in the figures, the first leading wire WR1 extends from a first side surface 1143 of the first piezoelectric element 114, and the second leading wire WR2 extends from a second side surface 1144 of the first piezoelectric element 114. The first side surface 1143 is connected between the first top surface 1141 and the first bottom surface 1142, and the second side surface 1144 is connected between the first top surface 1141 and the first bottom surface 1142.

Similarly, the second piezoelectric element 116 has a third leading wire WR3 and a fourth leading wire WR4, which are electrically connected to the external control circuit. The third leading wire WR3 extends from a third side surface 1163 of the second piezoelectric element 116, and the fourth leading wire WR4 extends from a fourth side surface 1164 of the second piezoelectric element 116.

The third side surface 1163 is connected between the second top surface 1161 and the second bottom surface 1162, and the fourth side surface 1164 is connected between the second top surface 1161 and the second bottom surface 1162. In this embodiment, in order to connect the aforementioned leading wires to the aforementioned external control circuit, the fixed assembly FA may have at least one opening 112T penetrating the main body 1120 of the base 112.

Specifically, in this embodiment, the main body 1120 may form two openings 112T, and the first leading wire WR1 to the fourth leading wire WR4 may pass through the openings 112T to be connected to the external control circuit. Based on such a design, the first leading wire WR1 to the fourth leading wire WR4 can be protected from being damaged.

In addition, in other embodiments, the opening 112T may be omitted. For example, the first leading wire WR1 to the fourth leading wire WR4 can pass through the accommodating opening 112H to be connected to the external control circuit.

Figure 7:
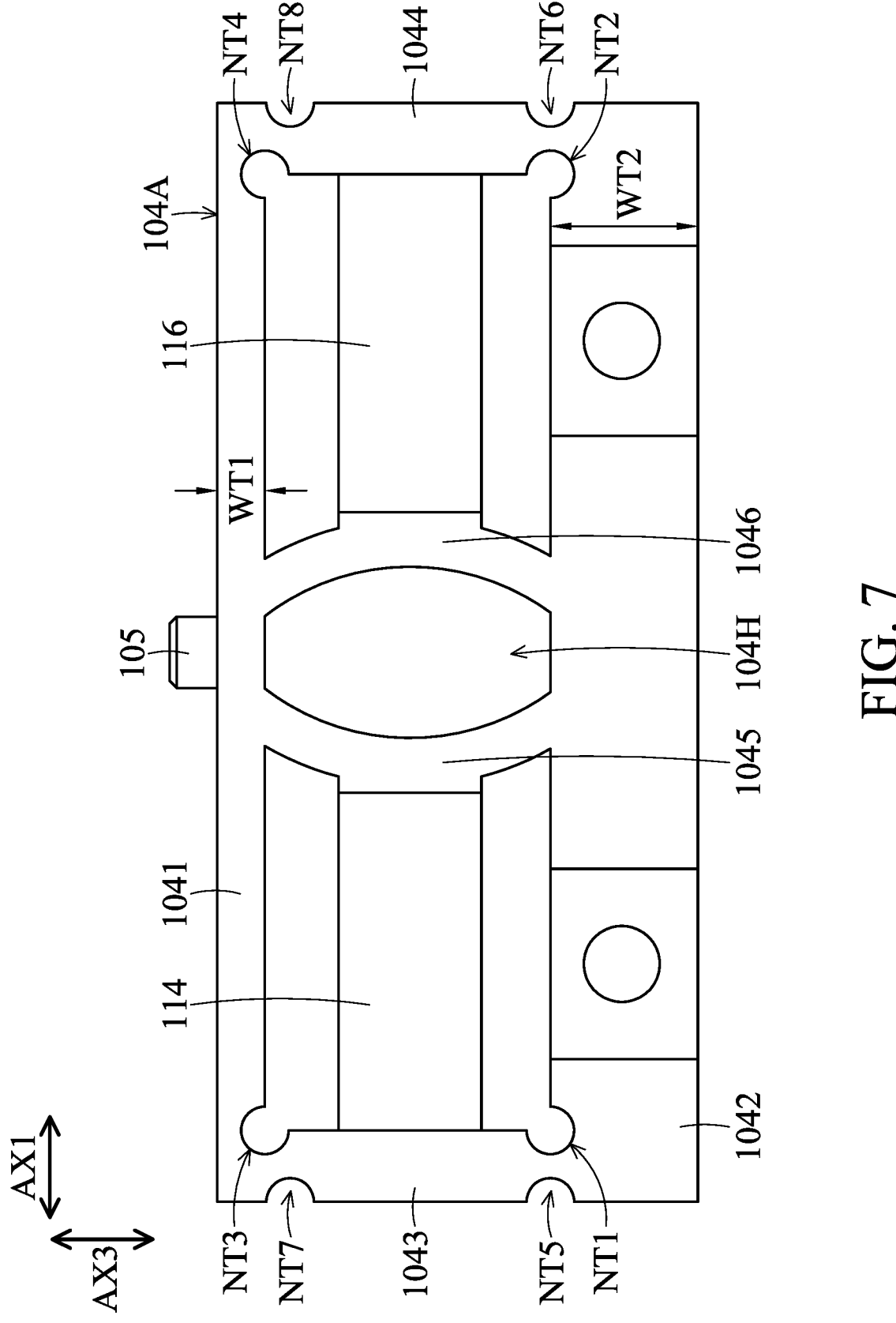
FIG. 7 is a top view of a first elastic member 104A according to another embodiment of the present disclosure.

Furthermore, please refer to FIG. 7, and FIG. 7 is a top view of a first elastic member 104A according to another embodiment of the present disclosure. The first elastic member 104A of this embodiment is similar to the first elastic member 104 of the previous embodiment, and the difference between them is that the first elastic member 104A of this embodiment omits the first bevel arm 1047 and the second bevel arm 1048, so that the third side arm 1043 and the fourth side arm 1044 are directly connected to the first side arm 1041.

Furthermore, the third notch NT3 and the fourth notch NT4 are formed on the first side arm 1041. Based on this design, the manufacturing process of the first elastic member 104A can be simplified. In addition, it should be noted that the width WT1 of the first side arm 1041 along the third axis AX3 is smaller than the width WT2 of the second side arm 1042 along the third axis AX3. Based on this design, it can be ensured that the first side arm 1041, the third side arm 1043 and the fourth side arm 1044 can flex more easily relative to the second side arm 1042.

In addition, in some embodiments, a notch may be formed at the intersection of the first inner arm 1045 and the first side arm 1041, and another notch may also be formed at the intersection of the second inner arm 1046 and the first side arm 1041 so as to increase the deformation speed of the first elastic member 104A.

Figure 8:
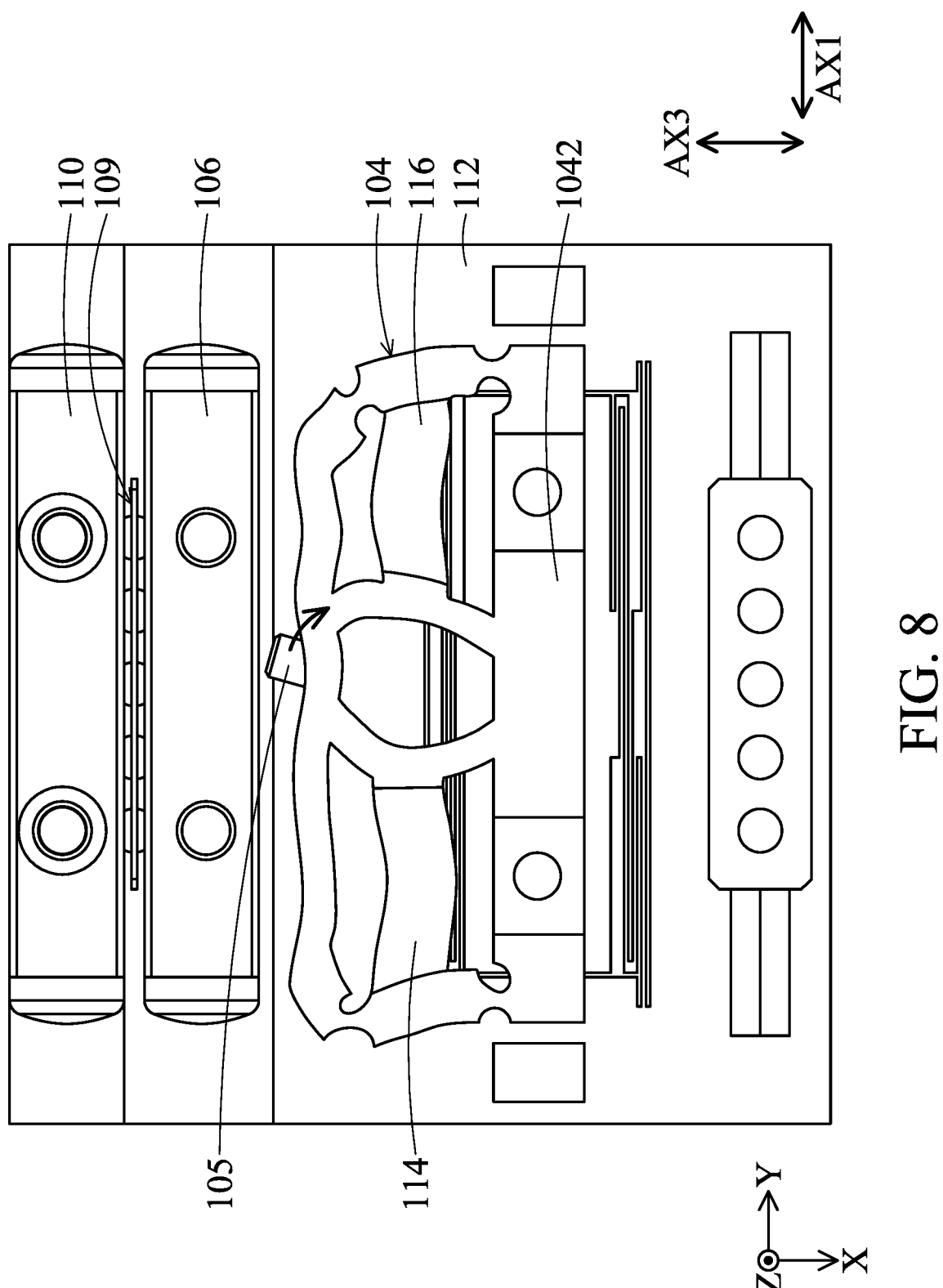
FIG. 8 to FIG. 10 is a top view illustrating that the first elastic member 104 deforms to drive the driving member 105 to move to be located at different positions according to an embodiment of the present disclosure.
Figure 9:
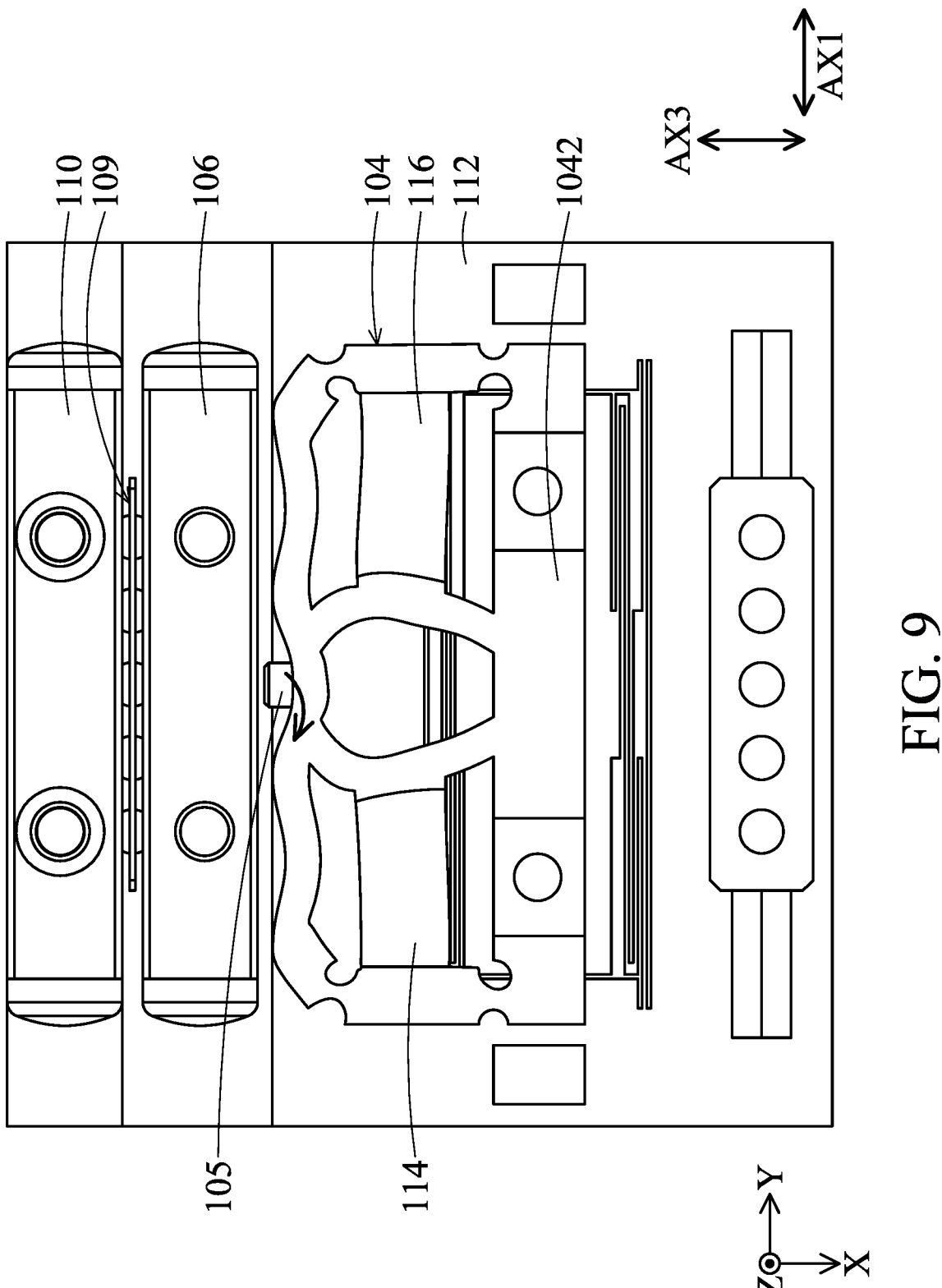
Figure 10:
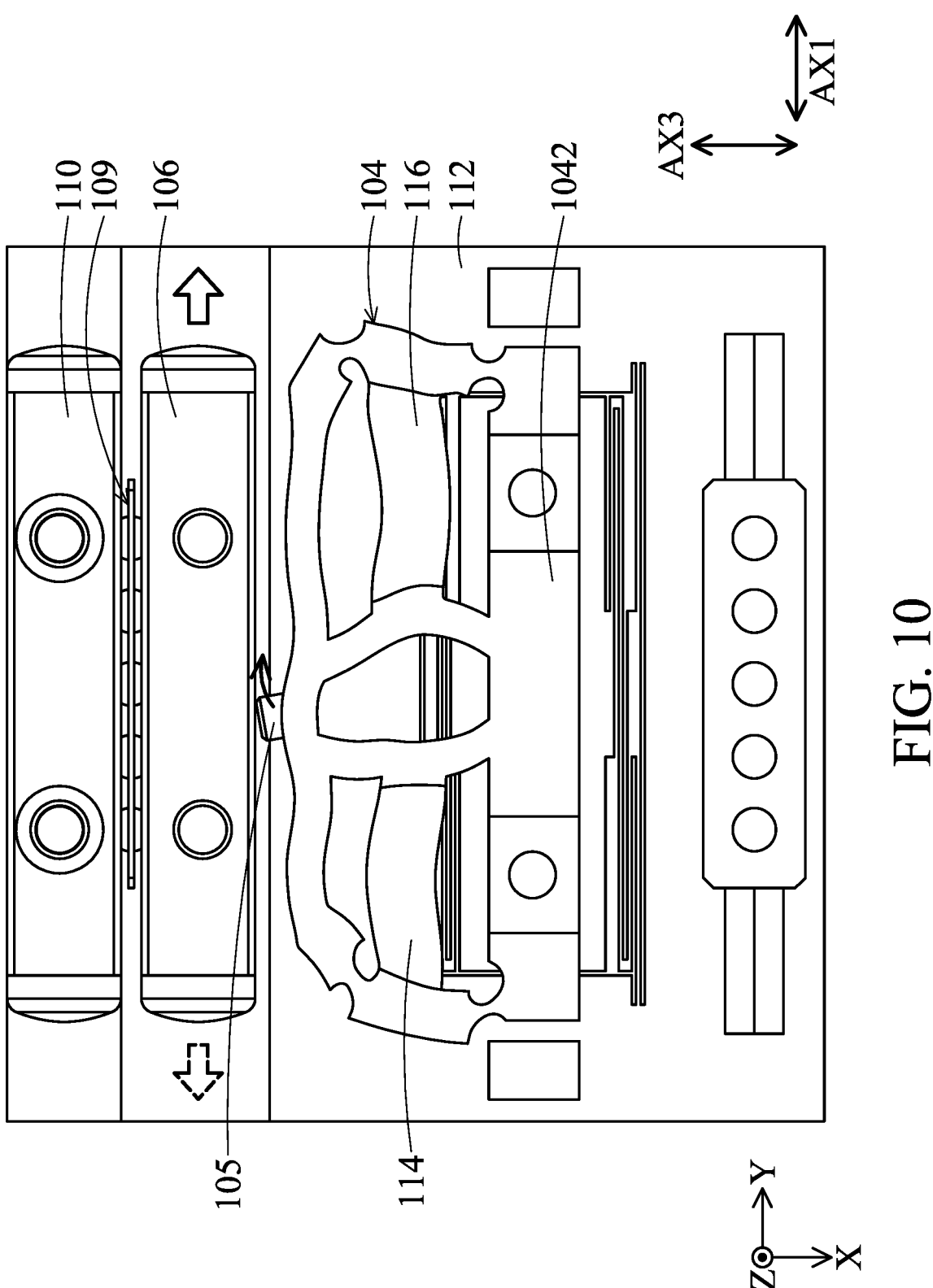

Next, please refer to FIG. 5, FIG. 8 to FIG. 10. FIG. 8 to FIG. 10 is a top view illustrating that the first elastic member 104 deforms to drive the driving member 105 to move to be located at different positions according to an embodiment of the present disclosure. In this embodiment, the first piezoelectric element 114 and the second piezoelectric element 116 are configured to respectively receive a first control signal CS1 and a second control signal CS2 (FIG. 2) from the aforementioned external control circuit via the leading wires to generate deformation.

After receiving the above control signals, the first piezoelectric element 114 and the second piezoelectric element 116 will deform according to the first control signal CS1 and the second control signal CS2 to push the first elastic member 104, so that the first elastic member 104 deforms to drive the driving member 105 to move relative to a base side arm (the second side arm 1042) of the first elastic member 104. That is, the base side arm (the second side arm 1042) does not deform.

The first control signal CS1 may be different from the second control signal CS2. That is, the external control circuit may independently control the first piezoelectric element 114 and the second piezoelectric element 116. Furthermore, the first control signal CS1 and the second control signal CS2 can be AC signals. For example, the first control signal CS1 can be a sine wave signal, and the second control signal CS2 can be a cosine wave signal, but they are not limited thereto.

It is worth noting that the frequency of the first control signal CS1 and the second control signal CS2 is equal to the overall resonance frequency of the first elastic element 104, the first piezoelectric element 114 and the second piezoelectric element 116. Such design can facilitate the first elastic member 104 to deform easily.

As shown in FIG. 5, FIG. 8 to FIG. 10, when the phase difference between the first control signal CS1 and the second control signal CS2 is −90 degrees, the first piezoelectric element 114 will first expand and the second piezoelectric element 116 will contract first, to drive the first elastic member 104 to deform, so that the driving member 105 rotates from the position in FIG. 5 to the positions in FIG. 8, FIG. 9 and FIG. 10 in sequence, and then return to the position of FIG. 5.

That is, the driving member 105 can continuously rotate clockwise around the second axis AX2 (the Z-axis), and the trajectory of the driving member 105 is an ellipse. Therefore, as shown in FIG. 10, the driving member 105 pushes the first guiding member 106 to move rightward along the first axis AX1 to drive the movable part 108 to move rightward relative to the base 112.

Conversely, when the phase difference between the first control signal CS1 and the second control signal CS2 is 90 degrees, the first piezoelectric element 114 and the second piezoelectric element 116 drive the first elastic member 104 to deform, so that the driving member 105 rotates from the position in FIG. 5 to the positions in FIG. 10, FIG. 9, and FIG. 8 in sequence, and then returns to the position in FIG. 5.

That is, the driving member 105 can continuously rotate counterclockwise around the second axis AX2 (the Z-axis), and the trajectory of the driving member 105 is an ellipse. Therefore, as shown in FIG. 10, the driving member 105 pushes the first guiding member 106 to move leftward along the first axis AX1 to drive the movable part 108 to move leftward relative to the base 112.

It is worth noting that, in the present disclosure, the displacement of the driving member 105 is greater than the deformation of the first piezoelectric element 114 or the second piezoelectric element 116. That is, based on the design of the present disclosure, the small deformation of the piezoelectric elements can be transformed into a larger displacement of the driving member 105, thereby achieving the purpose of miniaturization.

Figure 11:
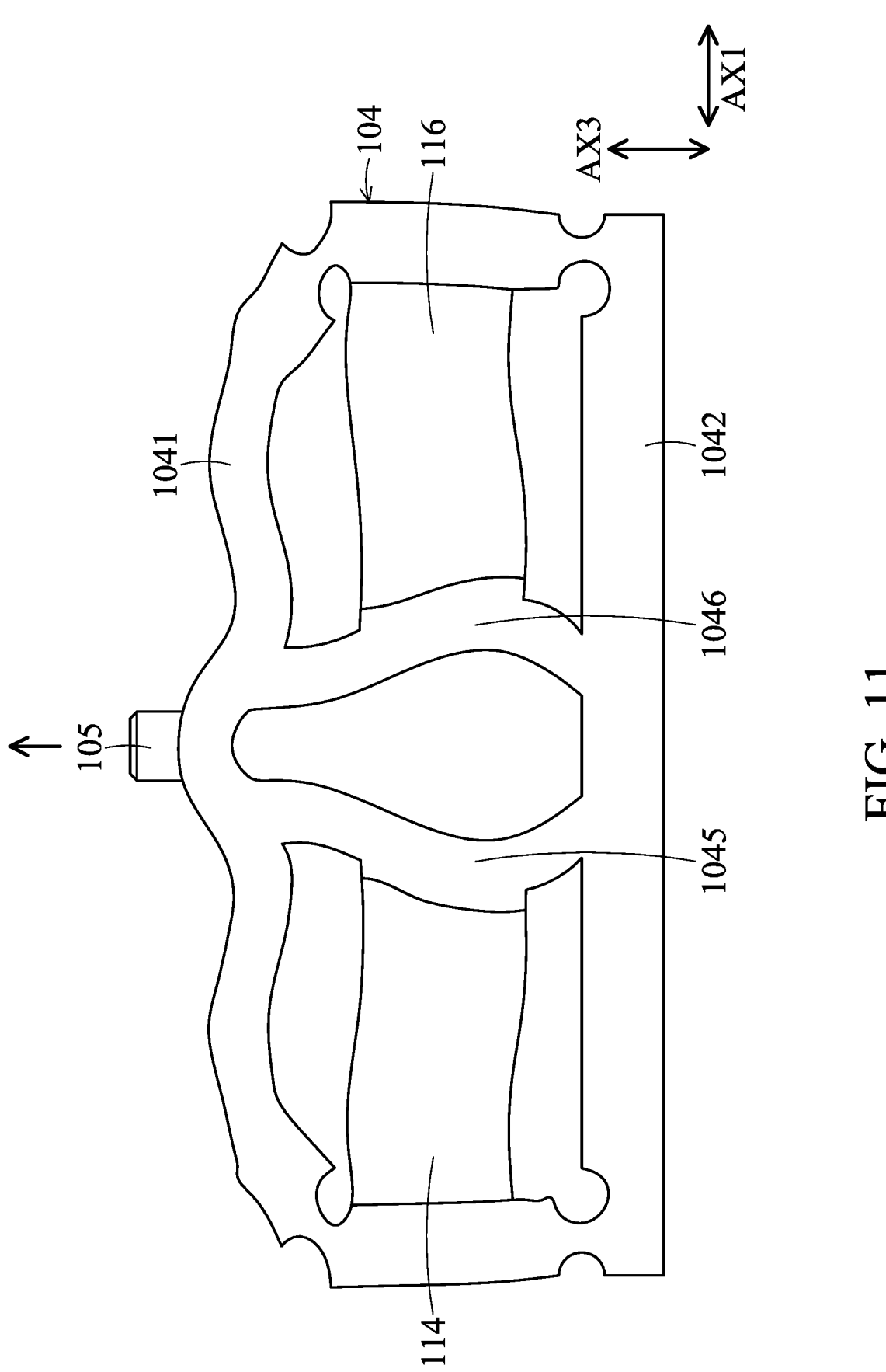
FIG. 11 and FIG. 12 are top views illustrating that the first elastic member 104 drives the driving member 105 to move to be at different positions according to an embodiment of the present disclosure.
Figure 12:
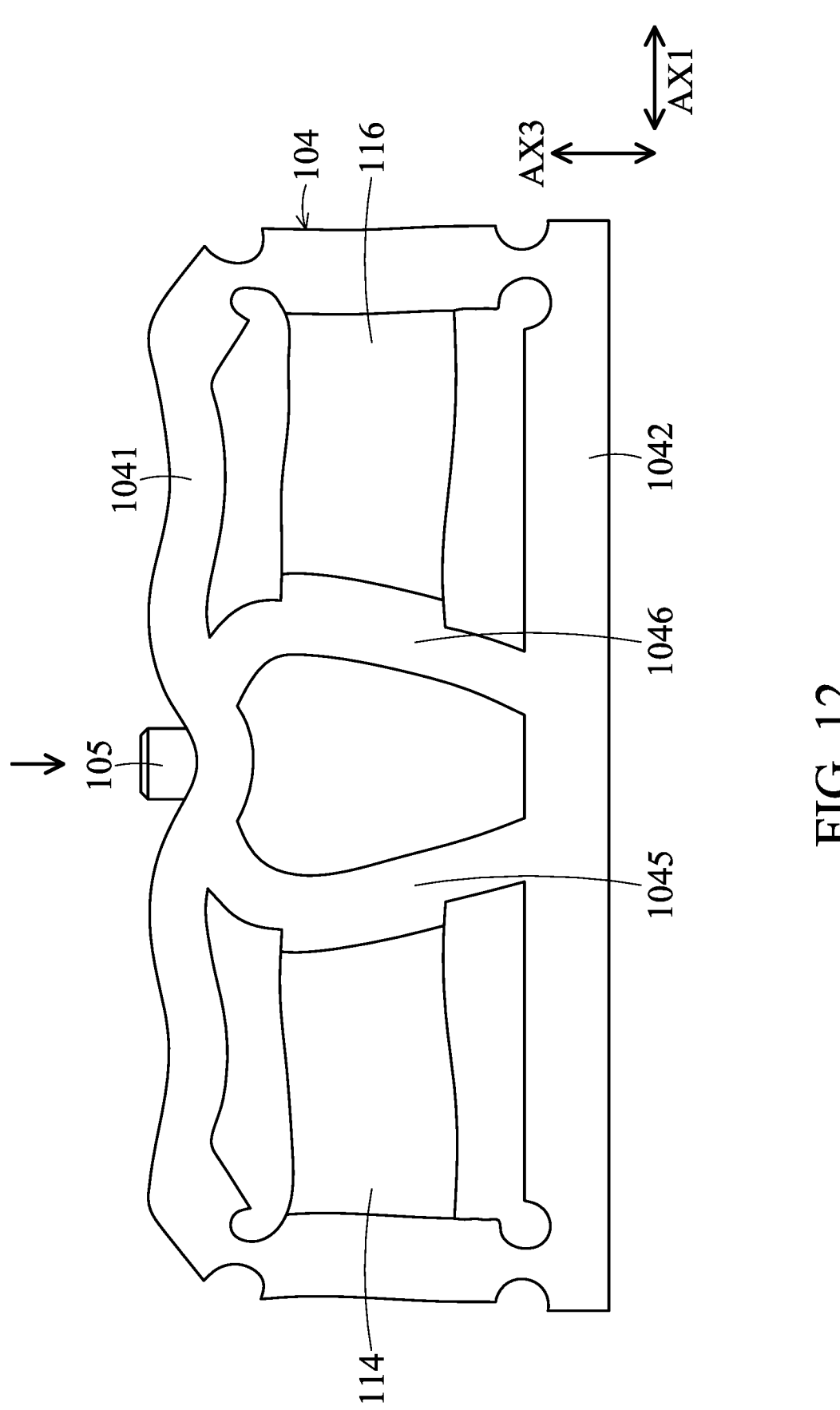

Next, please refer to FIG. 5, FIG. 11 and FIG. 12. FIG. 11 and FIG. 12 are top views illustrating that the first elastic member 104 drives the driving member 105 to move to be at different positions according to an embodiment of the present disclosure. In this embodiment, when the phase difference between the first control signal CS1 and the second control signal CS2 is 0 degrees, the first piezoelectric element 114 and the second piezoelectric element 116 will first expand at the same time, so that the first elastic element 104 deforms from an initial state in FIG. 5 to the a deformation state in FIG. 11.

Next, the first piezoelectric element 114 and the second piezoelectric element 116 contract at the same time, so that the first elastic member 104 changes from the first deformation state in FIG. 11 to a second deformation state in FIG. 12. Because the first elastic member 104 repeatedly switches between the first deformation state and the second deformation state, the first elastic member 104 can drive the driving member 105 to move back and forth along the third axis AX3. Based on the driving method, the driving module DM can drive an object to move back and forth along the third axis AX3.

Figure 13:
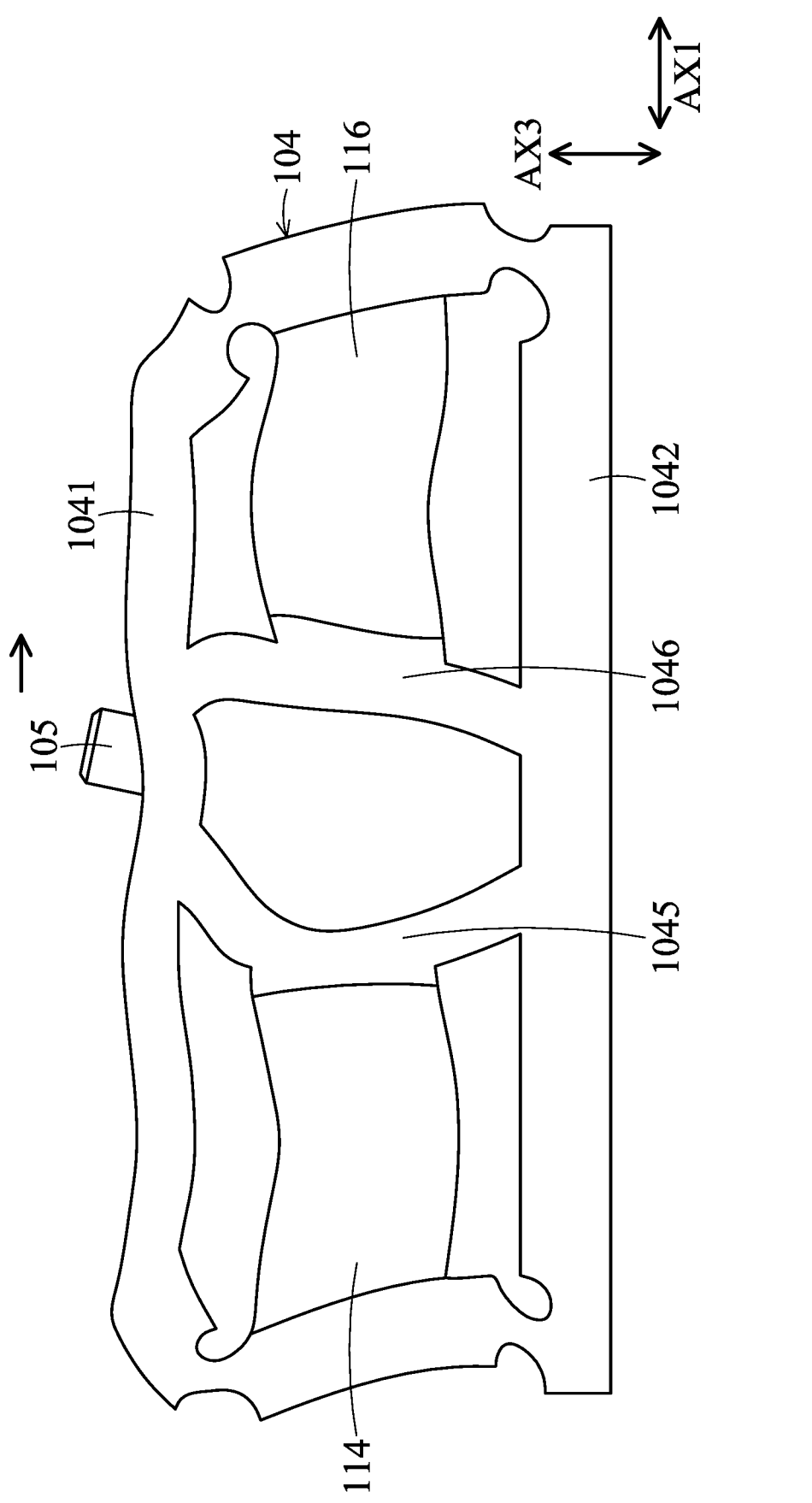
FIG. 13 and FIG. 14 are top views illustrating that the first elastic member 104 drives the driving member 105 to move to be at different positions according to an embodiment of the present disclosure.
Figure 14:
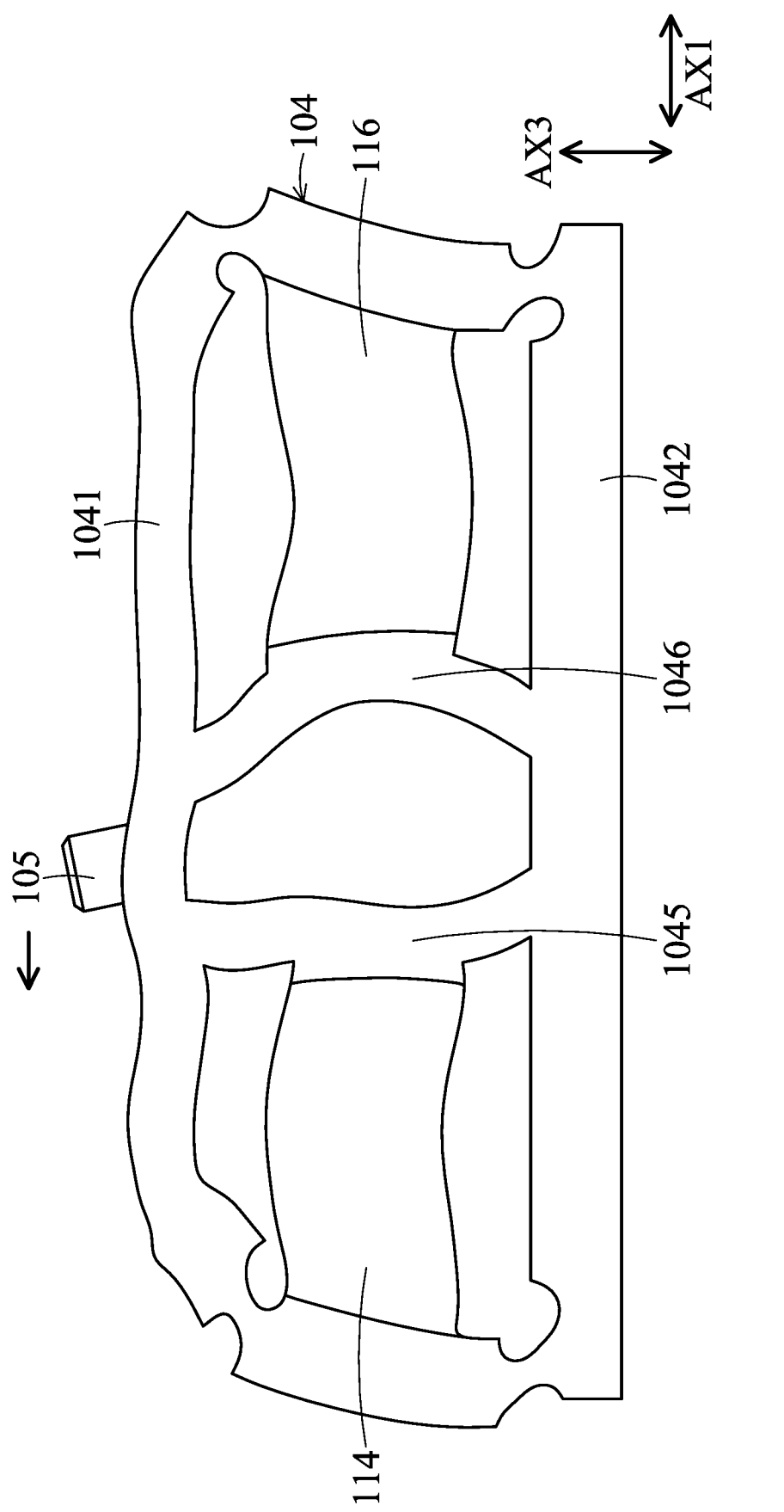

Next, please refer to FIG. 5, FIG. 13 and FIG. 14. FIG. 13 and FIG. 14 are top views illustrating that the first elastic member 104 drives the driving member 105 to move to be at different positions according to an embodiment of the present disclosure. In this embodiment, when the phase difference between the first control signal CS1 and the second control signal CS2 is 180 degrees, the first piezoelectric element 114 will contract first and the second piezoelectric element 116 will expand first, so that the first elastic member 104 deforms from the initial state in FIG. 5 to the third deformation state in FIG. 13.

Then, the first piezoelectric element 114 starts to expand and the second piezoelectric element 116 starts to contract, so that the first elastic member 104 changes from the third deformation state in FIG. 13 to a fourth deformation state in FIG. 14. Because the first elastic member 104 repeatedly switches between the third deformation state and the fourth deformation state, the first elastic member 104 can drive the driving member 105 to move back and forth along the first axis AX1.

Based on the driving method, the driving module DM can quickly touch or provide vibration to an object. For example, the driving module DM can provide vibration to the liquid so as to achieve the function of ultrasonic cleaning.

In conclusion, the present disclosure provides a driving mechanism, including a fixed assembly, a movable part and a driving module. The driving module is configured to drive the movable part to move relative to the fixed assembly. The driving module can include a first elastic member, a driving member and two piezoelectric elements. The two piezoelectric elements can be deformed independently to drive the first elastic member to deform correspondingly, so as to drive the driving member to move relative to the fixed assembly.

In some embodiments, when the phase difference of the control signals received by the two piezoelectric elements is −90 degrees, the two piezoelectric elements will drive the first elastic member 104 to deform, so that the driving member 105 continuously rotates clockwise around the second axis AX2. In some embodiments, when the phase difference of the control signals received by the two piezoelectric elements is 90 degrees, the two piezoelectric elements will drive the first elastic member 104 to deform, so that the driving member 105 continuously rotates counterclockwise around the second axis AX2.

Based on this design, the first elastic member 104 and the driving member 105 can quickly drive the movable part 108 to move back and forth along the first axis AX1, and can greatly improve the displacement accuracy compared with the traditional motor. In addition, because the driving mechanism 100 of the present disclosure does not require conventional coils, magnets and additional pushing components, the overall volume of the driving mechanism 100 can be effectively reduced so as to achieve the purpose of miniaturization.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A piezoelectric driving mechanism, comprising:
   a fixed assembly;
   a movable part, configured to move relative to the fixed assembly; and
   a driving module, configured to drive the movable part to move relative to the fixed assembly;

wherein when viewed in a first axis, the driving module is disposed between the fixed assembly and the movable part;

the driving module includes a first elastic member and a piezoelectric assembly;

the driving module further includes a driving member fixedly disposed on the first elastic member;

the piezoelectric assembly is configured to drive the first elastic member to deform, so as to drive the driving member to move relative to the fixed assembly;

the driving member is configured to drive the movable part to move relative to the fixed assembly along the first axis;

when viewed along a second axis, the first elastic member has a rectangular structure;

the first axis is perpendicular to the second axis;

the first elastic member has a first side arm and a second side arm;

the first side arm and the second side arm extend along the first axis;

the driving member is fixedly disposed on the first side arm;

the first elastic member further has a third side arm and a fourth side arm connected between the first side arm and the second side arm;

the third side arm and the fourth side arm extend along a third axis;

the third axis is perpendicular to the first axis and the second axis.

2. The piezoelectric driving mechanism as claimed in claim 1, wherein the first elastic member is made of a first metal material;

the first metal material includes stainless steel;

the driving member is made of a second metal material;

the second metal material includes tool steel;

rigidity of the driving member is greater than rigidity of the first elastic member;

the driving member has a cylindrical structure.

3. The piezoelectric driving mechanism as claimed in claim 2, wherein the first elastic member further has a first inner arm and a second inner arm;

the first inner arm and the second inner arm are connected between the first side arm and the second side arm;

the first side arm, the second side arm, the third side arm, the fourth side arm, the first inner arm and the second inner arm are integrally formed as one piece;

the first inner arm is bent toward the third side arm;

the second inner arm is bent toward the fourth side arm;

a central hole is formed between the first inner arm and the second inner arm;

the central hole has an elliptical structure.

4. The piezoelectric driving mechanism as claimed in claim 3, wherein the piezoelectric assembly includes a first piezoelectric element connected between the third side arm and the first inner arm;

when viewed along the second axis, the first piezoelectric element has a rectangular cuboid structure;

the first piezoelectric element has a first top surface fixedly connected to the first inner arm by a first adhesive element;

the first top surface has four sides, and the first adhesive element is disposed on the four sides;

the first piezoelectric element has a first bottom surface fixedly connected to the third side arm by a second adhesive element;

the first bottom surface has four sides, and the second adhesive element is disposed on the four sides;

the first top surface and the first bottom surface are non-conductive.

5. The piezoelectric driving mechanism as claimed in claim 4, wherein the piezoelectric assembly includes a second piezoelectric element connected between the fourth side arm and the second inner arm;

when viewed along the second axis, the second piezoelectric element has a rectangular cuboid structure;

the second piezoelectric element has a second top surface fixedly connected to the second inner arm by a third adhesive element;

the second top surface has four sides, and the third adhesive element is disposed on the four sides;

the second piezoelectric element has a second bottom surface fixedly connected to the fourth side arm by a fourth adhesive element;

the second bottom surface has four sides, and the fourth adhesive element is disposed on the four sides;

the second top surface and the second bottom surface are non-conductive;

when viewed along the second axis, the third side arm, the first piezoelectric element and the first inner arm are symmetrical to the fourth side arm, the second piezoelectric element and the second inner arm.

6. The piezoelectric driving mechanism as claimed in claim 5, wherein the first piezoelectric element is configured to receive a first control signal;

the second piezoelectric element is configured to receive a second control signal;

the first control signal is different from the second control signal;

the frequency of the first control signal and the second control signal is equal to the overall resonance frequency of the first elastic member, the first piezoelectric element and the second piezoelectric element.

7. The piezoelectric driving mechanism as claimed in claim 6, wherein a plurality of notches are formed on the first elastic member;

the notches include a first notch formed between the second side arm and the third side arm;

the notches further include a second notch formed between the second side arm and the fourth side arm;

the first notch is symmetrical to the second notch.

8. The piezoelectric driving mechanism as claimed in claim 7, wherein the notches further include a third notch formed between the first side arm and the third side arm;

the notches further include a fourth notch formed between the first side arm and the fourth side arm;

the third notch is symmetrical to the fourth notch;

each of the first notch to the fourth notch has a circular arc structure.

9. The piezoelectric driving mechanism as claimed in claim 8, wherein the notches further include a fifth notch formed between the second side arm and the third side arm;

the notches further include a sixth notch formed between the second side arm and the fourth side arm;

the fifth notch is symmetrical to the sixth notch;

the first notch and the fifth notch are formed on opposite sides of the third side arm;

the second notch and the sixth notch are formed on opposite sides of the fourth side arm.

10. The piezoelectric driving mechanism as claimed in claim 9, wherein the notches further include a seventh notch formed between the first side arm and the third side arm;

the notches further include an eighth notch formed between the first side arm and the fourth side arm;

the seventh notch is symmetrical to the eighth notch;

the third notch and the seventh notch are formed on opposite sides of the third side arm;

the fourth notch and the eighth notch are formed on opposite sides of the fourth side arm.

11. The piezoelectric driving mechanism as claimed in claim 10, wherein the third side arm has a thick column portion and a thin column portion;

the thin column portion is formed between the first notch and the fifth notch;

a width of the thick column portion along the first axis is at least twice a width of the thin column portion along the first axis.

12. The piezoelectric driving mechanism as claimed in claim 11, wherein the first elastic member further has a first bevel arm connected between the first side arm and the third side arm;

the first bevel arm is not parallel to the first axis and the third axis;

the third notch and the seventh notch are formed on the first bevel arm.

13. The piezoelectric driving mechanism as claimed in claim 12, wherein the first elastic member further has a second bevel arm connected between the first side arm and the fourth side arm;

the second bevel arm is not parallel to the first axis and the third axis;

the fourth notch and the eighth notch are formed on the first bevel arm.

14. The piezoelectric driving mechanism as claimed in claim 6, wherein the first piezoelectric element has a first leading wire and a second leading wire, which are electrically connected to an external control circuit;

the first leading wire extends from a first side surface of the first piezoelectric element;

the second leading wire extends from a second side surface of the first piezoelectric element;

the first side surface is connected between the first top surface and the first bottom surface;

the second side surface is connected between the first top surface and the first bottom surface.

15. The piezoelectric driving mechanism as claimed in claim 14, wherein the second piezoelectric element has a third leading wire and a fourth leading wire which are electrically connected to the external control circuit;

the third leading wire extends from a third side surface of the second piezoelectric element;

the fourth leading wire extends from a fourth side surface of the second piezoelectric element;

the third side surface is connected between the second top surface and the second bottom surface;

the fourth side surface is connected between the second top surface and the second bottom surface;

the fixed assembly has at least one opening, and the first leading wire to the fourth leading wire pass through the at least one opening to be connected to the external control circuit.

16. The piezoelectric driving mechanism as claimed in claim 6, wherein the first piezoelectric element is configured to deform according to the first control signal;

the second piezoelectric element is configured to deform according to the second control signal;

the first control signal and the second control signal are AC signals;

the first piezoelectric element is configured to expand or contract according to the first control signal;

the second piezoelectric element is configured to expand or contract according to the second control signal;

when the phase difference between the first control signal and the second control signal is 0 degrees, the first piezoelectric element and the second piezoelectric element drive the first elastic member to deform so that the driving member moves back and forth along the third axis.

17. The piezoelectric driving mechanism as claimed in claim 16, wherein when the phase difference between the first control signal and the second control signal is 180 degrees, the first piezoelectric element and the second piezoelectric element drive the first elastic member to deform so that the driving member moves back and forth along the first axis.

18. The piezoelectric driving mechanism as claimed in claim 17, wherein when the phase difference between the first control signal and the second control signal is −90 degrees, the first piezoelectric element and the second piezoelectric element drive the first elastic member to deform so that the driving member rotates clockwise around the second axis;

when the driving member rotates clockwise around the second axis, a trajectory of the driving member is an ellipse.

19. The piezoelectric driving mechanism as claimed in claim 18, wherein when the phase difference between the first control signal and the second control signal is 90 degrees, the first piezoelectric element and the second piezoelectric element drive the first elastic member to deform so that the driving member rotates counterclockwise around the second axis;

when the driving member rotates counterclockwise around the second axis, a trajectory of the driving member is an ellipse;

displacement of the driving member is greater than deformation of the first piezoelectric element or the second piezoelectric element.

* * * * *